ANALOG AND ANALOG-DIGITAL COMPUTER MODE AND TIME-SCALE CONTROL SYSTEM

Filed April 14, 1967 3 Sheets-Sheet 1

INVENTOR.
ELMER G GILBERT
BY Richard D. Stephens
ATTORNEY

INVENTOR.
ELMER G. GILBERT
BY Richard L. Stephens
ATTORNEY

Nov. 25, 1969 E. G. GILBERT 3,480,769

ANALOG AND ANALOG-DIGITAL COMPUTER MODE AND TIME-SCALE CONTROL SYSTEM

Filed April 14, 1967 3 Sheets-Sheet 3

INVENTOR.
ELMER G. GILBERT

BY Richard W. Stephens

ATTORNEY

United States Patent Office 3,480,769

Patented Nov. 25, 1969

3,480,769

ANALOG AND ANALOG-DIGITAL COMPUTER MODE AND TIME-SCALE CONTROL SYSTEM

Elmer G. Gilbert, Ann Arbor, Mich., assignor to Applied Dynamics, Inc., Ann Arbor, Mich., a corporation of Michigan Filed Apr. 14, 1967, Ser. No. 635,294

Int. Cl. G06g *7/18, 7/48;* G06j *1/02*

U.S. Cl. 235—183 16 Claims

ABSTRACT OF THE DISCLOSURE

In order to reduce control wiring between control devices such as manual pushbuttons or automatic control registers and analog computer circuits such as integrators which must be switched into many different operating configurations, control signals are encoded and routed over single wire busses and decoded at each analog computer circuit so that the signal on a single buss can provide any one of a fairly large number of operating conditions, such as time-scales, modes, etc. Different coding schemes utilizing phase, frequency, magnitude and pulse width are disclosed. Plural busses carrying different coded signals are provided and each analog computer circuit is connected to be controlled by a predetermined bus unless a patched connection is made to make a given such circuit responsive to the signal on a different bus, using an override switching system.

This invention relates to analog computer and analog-digital computer control circuitry, and, more particularly, to improved apparatus for routing selection signals within an analog or analog-digital computer to reduce the wiring required in such a computer.

In the analog computer, hybrid analog-digital computer, automatic control and instrumentation arts, it is frequently necessary or desirable to operate various electronic circuits under various selected conditions, such as to operate electronic integrators at a selected one of a plurality of available time-scales, or in a selected one of a plurality of available operating modes. The wiring necessary to allow operation under such diverse conditions, has been, in general, straightforward and obvious, but with the growth and sophistication of modern computers has become very extensive and extremely expensive. While the provision of additional circuits from a patchboard to accomodate additional integrator time scales for a few integrators has been common and straightforward in the prior art, the use of perhaps a hundred or more integrators and the requirement for further integrator time scales, has made it extremely difficult and expensive to provide a sufficiently versatile computer using prior art techniques. The use of increased numbers of integrators and the provision of larger numbers of time scales or other operating modes has not only considerably increased the amount of wiring required in a prior art computer, but very disadvantageously has required the use of many more patch-holes on the computer patchboard to accommodate time-scale control of all of the integrators. Mere increase in size of the patchbay is not only expensive, but it creates other problems, such as increases in the lengths of various other connections which must be made to the patchbay.

In accordance with the present invention, a given circuit such as an integrator, for example, may be controlled to operate with a selected one of a plurality of time scales by a single on a single control line, or may be controlled by a single signal on a single control line to operate in a selected one of a plurality of operating modes, or thirdly, may be controlled by a single signal to operate in a selected operating mode with a selected time scale.

While the invention will be illustrated in connection with time-scale control of the integrators of a computer, it will become apparent that the invention is readily applicable as well not only to other types of control of integrators, but to selective control of various other computing elements, such as to select one or several of a number of input or feedback scaling resistors for an amplifier, for example, or to selectively control one or more of a plurality of switches used with a resistor ladder network to generate a desired analog voltage.

Thus it is a primary object of the present invention to provide improved analog computer or hybrid analog-digital computer apparatus in which a selected one of a plurality of possible operational configurations of a computing element, such as an electronic integrator, may be controlled with a reduced number of wired connections between the computing element and the computer patchboard and control center.

Other objects of the invention will in part be obvious and will in part appear hereinafter.

The invention accordingly comprises the features of construction, combinations of elements, and arrangement of parts, which will be exemplified in the constructions hereinafter set forth.

For a fuller understanding of the nature and objects of the invention, reference should be had to the following detailed description taken in connection with the accompanying drawings, in which.

Figure 1:
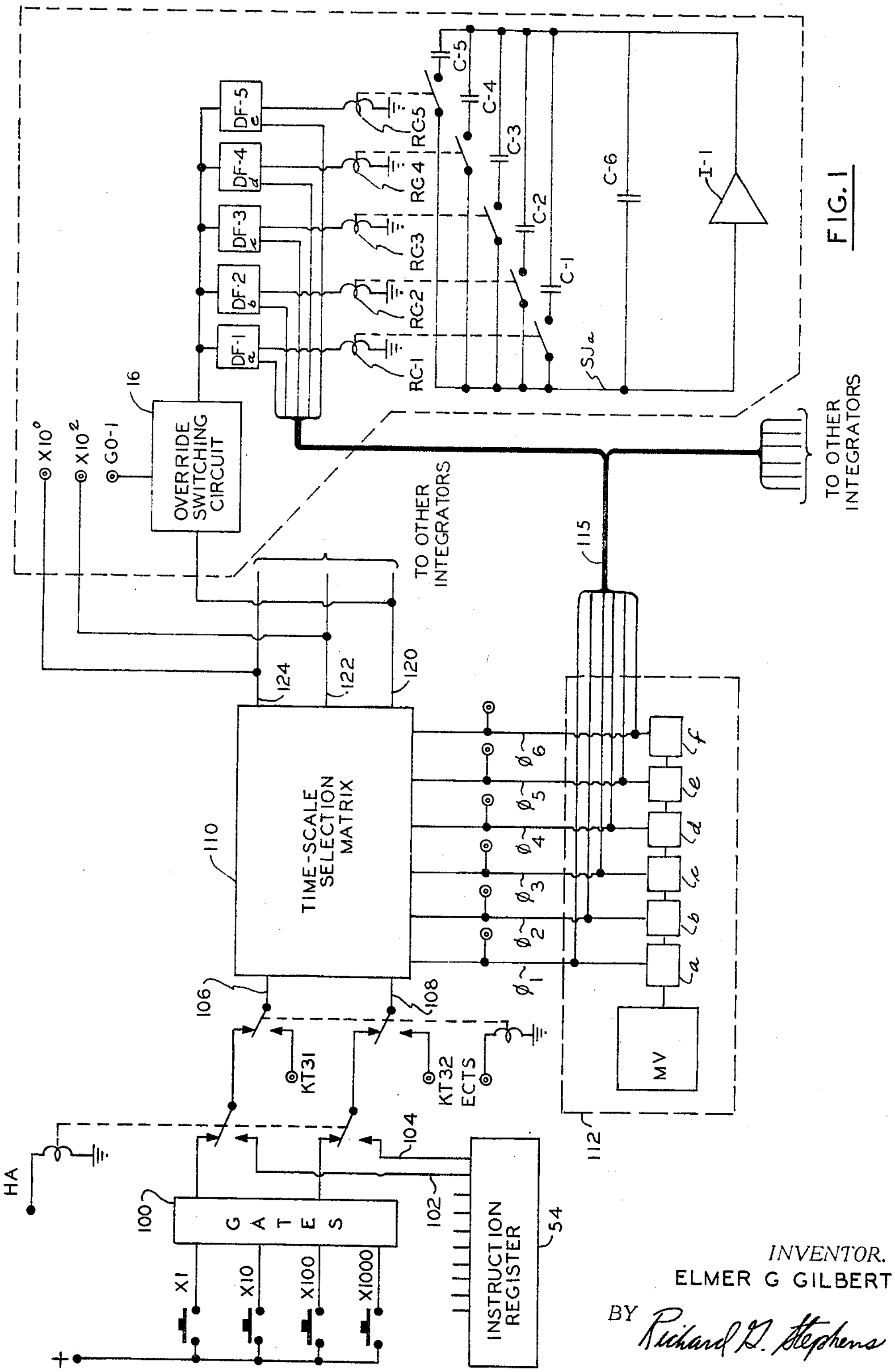
FIG. 1 is an electrical schematic diagram, largely in block form, illustrating the use of the invention to provide selective control of the operating time-scale of an electronic integrator.

FIG. 1 illustrates schematically an exemplary form of the invention used to select the operating time-scale of the many integrators ordinarily associated with a modern analog computer. To allow integration on a plurality of different time scales, each integrator in the computer is provided with six computing capacitors, such as those shown in FIG. 1 associated with integrator I–I, with individual (nominal) values of 10, 1, 0.1, 0.01, .001 and .0001 mfd. One side of each of five of the capacitors is permanently wired to the integrator output terminal, and any one of these five capacitors can be selected and connected to the integrator summing junction by means of the computer time-scale control circuitry to be described. One capacitor (C–6, of .0001 mfd.) may be permanently conected across the amplifier, to effect a further reduction in control wiring, as will be explained below.

Figure 2:
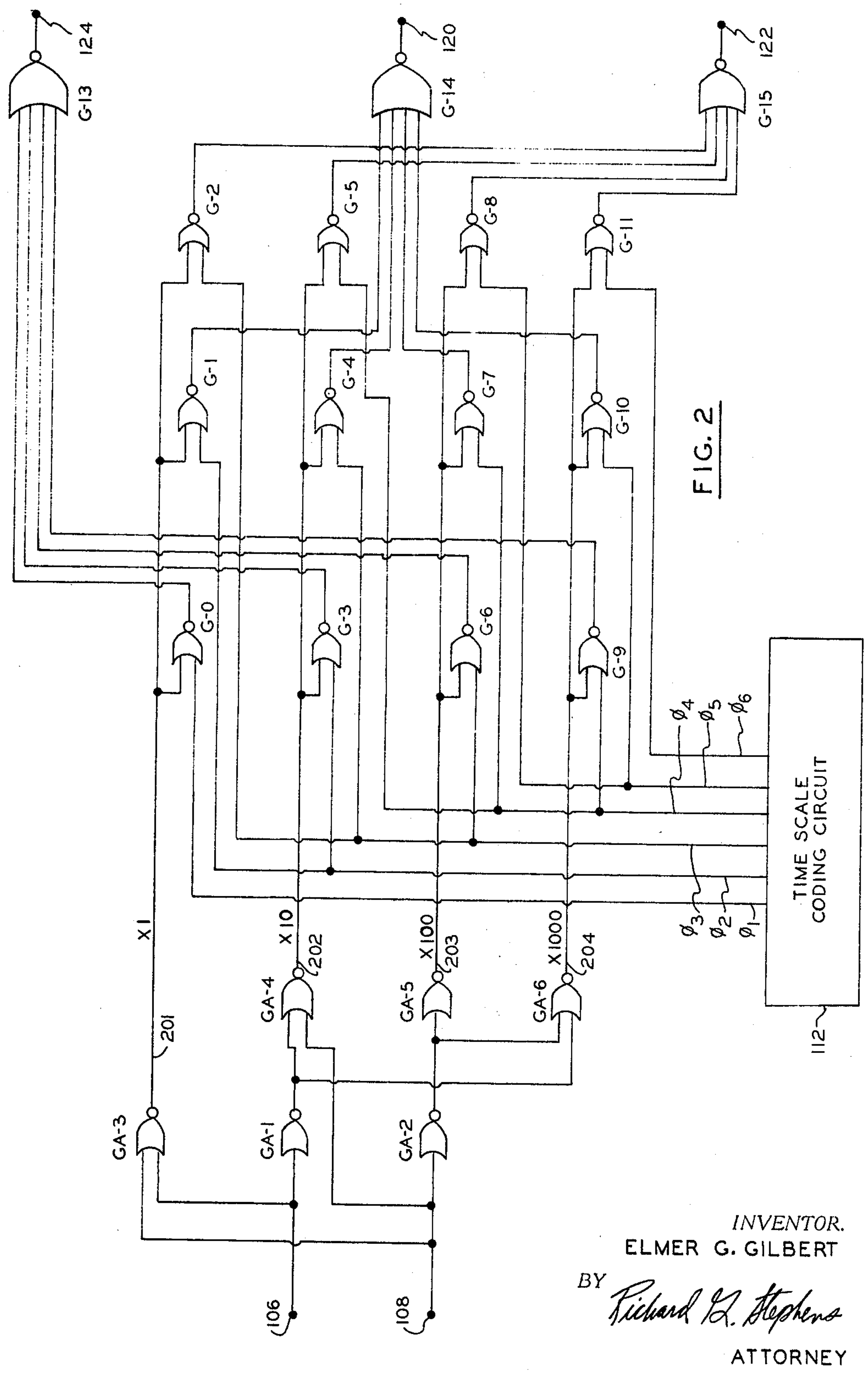
FIG. 2 is a block diagram of one suitable form of time-scale selection matrix which may be used in the circuit of FIG. 1.

The time-scale of the computer is advantageously arranged to allow the operator to select any of four different time scales without re-patching and by mere depression of one of four mutually-interlocked latching pushbuttons shown at the left of FIG. 1 at X1, X10, X100 and X1000. If "Hybrid Access" relay HA is energized, selection of any one of the four time scales may be determined instead by a digital computer (not shown) from two of the bits of the digital word placed in instruction register 54 by the digital computer. Depression of a given one of the four pushbuttons (or the presence of a particular bit pattern on lines 102 and 104 of instruction register 54) provides one of four possible two-bit parallel digital signals on input lines 106, 108 of a time-scale selection matrix 110 which also receives six coded input signals from time-scale waveform generator 112. Gate circuit 100, which functions to encode the particular one energized pushbutton line to provide the two-bit parallel signal on lines 106 and 108, is well known in the art. One form of selection matrix is illustrated in FIG. 2. A preferred form of waveform generator 112 is illustrated in FIG. 1. In a preferred embodiment of the invention, the six signals provided by generator 112 comprise six different phases of a waveform. A conventional free-running multivibrator MV periodically provides output pulses, once every 1.5 milliseconds, for example, and the multivibrator output is connected as shown to a succession of pulse generators *a* through *f*, each of which is arranged to provide an output pulse having a duration of .15 millisecond, for example, upon the receipt of the trailing edge of the pulse from its neighbor to the left. Hence each trailing edge of the output pulse from multivibrator MV is followed by six .15 millisecond pulses emanating successively from the six pulse generators. Each of the six pulse generators may comprise a simple and conventional "one-shot" multivibrator. The pulse outputs of pulse generators *a* through *f* are labelled $\phi_1$ through $\phi_6$ in FIG. 1. The individual closure of one of pushbuttons X1, X10, X100 and X1000 functions to connect the $\phi_2$, $\phi_3$, $\phi_4$ or $\phi_5$ phase signal, respectively, from waveform generator 112 to control buss 120, to which all of the decoders of the integrators are connected (preferably through an individual over-ride switching circuit), and an individual decoder and selector circuit of a type shown associated with integrator I–1 in FIG. 1. Five phases of the generator 112 waveform are also routed to the decoder associated with each integrator, as symbolized by cable 115 in FIG. 1, and the sixth phase $\phi_6$ made available at the computer patchboard. The over-ride switching circuit shown in block form at 16 preferably comprises the electronic override selective switching system shown in application Ser. No. 624,781, filed Mar. 21, 1967, by Edward O. Gilbert, but alternatively may comprise a known form of mechanical over-ride switching arrangement using Form C contacts at the computer patchbay. The function of circuit 16 in FIG. 1 is to automatically connect line 120 to decoders DF–1 through DF–5 unless some other signal is patched to patch-hole GO–1, but if a signal is patched or connected to hole GO–1 for the patched or connected signal to over-ride the signal on line 120 and to be applied to the five decoder circuits DF–1 through DF–5.

Closure of a given pushbutton not only serves to connect the waveform phase on line 120 to the over-ride switching circuit, but also serves to apply to busses 122 and 124 the next higher and next lower phases, respectively, from encoder 112, and these adjacent phases are routed to respective holes at the patchboard areas associated with each of the integrators. Thus, for example, depression of the X1 pushbutton serves to connect the $\phi_2$ waveform to the integrator I–1 decoder and capacitor selector circuit (assuming that no over-riding input signal has been patched to hole GO–1) and serves to connect the $\phi_1$ and $\phi_3$ adjacent phase waveforms to patch-holes $X10^0$ and $X10^2$, respectively. If the X1000 pushbutton is closed instead, the $\phi_5$ waveform would be applied to the integrator and the $\phi_4$ and $\phi_6$ waveforms to the $X10^0$ and $X10^2$ patchholes, assuming again that no over-riding signal has been patched to patch-hole GO–1.

The purpose of applying a given one of the five waveforms to the decoder and selector circuit of a given integrator is to connect a given one of the six capacitors of the integrator to the integrator summing junction. The particular waveform phase provided on line 120 by virtue of a given pushbutton selection (or given signal in instruction register 54) is connected as shown through the over-ride switching citcuit 16 to each of five decoder circuits associated with a given integrator, those decoder circuits shown in FIG. 1 being labelled DF–1 through DF–5. The $\phi_1$ waveform is connected to DF–1, the $\phi_2$ waveform to DF–2, and so forth. Each decoder circuit operates as a phase detector, or an AND gate. If the $\phi_1$ phase of the waveform is present on line 120, decoder DF–1 simultaneously receives two-input signals and energizes relay RC–1, and thereby connects capacitor C–1 to the integrator summing junction, in parallel with permanently connected capacitor C–6, and because no other decoder receives two simultaneous input signals, none of them operate their relays to connect their respective capacitors to the integrator summing junction. If instead of $\phi_2$ phase is present on line 120, decoder DF–2 simultaneously receives two input signals and energizes relay RC–2, and thereby connects capacitor C–2 to the integrator summing junction. A further savings in decoder circuits, relay connections and wiring may be effected in a manner shown, by permanently connecting the smallest capacitor (.0001 mfd.) and subtracting its value from the nominal ratings of capacitors C–1 through C–5 in determining their sizes, so that proper nominal capacities will be provided when they are individually connected in parallel with capacitor C–6. It will be readily apparent to those skilled in the art that a wide variety of different types of "phase detector" or equivalent gate circuits may be utilized as the decoders of FIG. 1 to energize a relay upon simultaneous receipt of signals from line 120 and one output line of waveform generator 112. The relays RC–1 through RC–5 preferably comprise magnetic reed relays. It is necessary, of course, that the repetition rate and pulse width and height of a single phase of the waveform be great enough that the reed relay selected to be closed not open between successive pulses, which may easily be done, using the pulse generator pulse widths and repetition rate mentioned above, and any desired pulse heights may be applied to the relay coils, of course, by use of a desired amplification in coincidence circuits DF–1 through DF–5. The coincidence circuit outputs also may be smoothed in conventional manner, by use of shunt capacitors across their outputs, but in some applications it is highly desirable that the coincidence circuit time-constants be kept quite short, so that a given reed relay will open rapidly before another relay closes when the time-scale is changed, so that a highly-charged larger one of the capacitors will not be temporarily connected in parallel with an uncharged capacitor, which can result in a current surge which will destroy some reed relay contacts. The charge on capacitor C–6 in FIG. 1 is insufficient to cause such damage due to the small size of capacitor C–6.

It will be seen that any one of the four mid-sizes (C–2, C–3, C–4 or C–5) of the six capacitors may be selected by depression of one of the four pushbuttons without any patching being necessary. If connection of the largest capacitor C–1 is desired, it will be seen that it may be connected merely by patching the $X10^0$ patch-hole to the GO–1 patch-hole. It will be seen that a given problem can be programmed with certain integrators having a time-constant ten times as great as that of other integrators and further integrators having a time-constant only one-tenth as great. Thus the desired capacitors for all the integrators may be connected very conveniently, with only those of a "non-standard" size requiring a patchcord connection. Then, by merely successively pushing different ones of the four pushbuttons, a given problem can be solved successively with four different time scales, with selection of different pushbuttons automatically changing by proper amounts the sizes of "non-standard" capacitors which were selected by patching as well as appropriately changing the sizes of the standard capacitors. If the GO–1 terminal is patched to the $X10^0$ hole, the feedback capacitor connected to integrator I–1 will always be, regardless of the time-scale selected, ten times as large as those capacitors of integrators not connected by patched overriding signals, and one hundred times as large as those capacitors selected by patching to an $X10^2$ hole.

For solution of certain special problems, it is possible to provide integrator time-constants which vary between the various integrators by a factor of more than 100, by patching the "GO" leads of one or more of the various integrators to patch-holes others than the $X10^0$ and $X10^2$ terminals shown. For these purposes, all six phase output signals of the encoder are made available at the computer logic patchboard.

If desired, a separate time-scale selection matrix (not shown) may be provided for different groups, or "fields," of integrators, and a relay (not shown) used to switch control of the integrators from busses 120 to similar output busses of such a separate selection matrix. Also, the time-scale selection matrix may be controlled other than from the pushbuttons or the instruction register. Patch-hole ECTS represents a logic patchboard hole, which if energized, operates relay ER, which re-connects control lines 106 and 108 to place time-scale control of the computer under control of any signals which the operator has patched to further patch-holes KT31 and KT32.

Selection of various ones of six different integrator capacitors at each of the many integrators ordinarily included in a computer, together with automatic scaling-up and scaling down of all integrators by mere pushbutton control has been difficult and expensive in the prior art due to the immense amount of patchboard space and control wiring required in the prior art for such a purpose. An important feature of the present invention is the generation, in response to pushbutton operation, of encoded signals defining capacitor selection, so that one of many (e.g. six) capacitors may be selected and connected by a single signal.

The exemplary selection circuit shown in FIG. 2 may take a variety of different forms, as will be apparent to those skilled in the art. The function of the selection circuit in any embodiment of the invention is to receive a first plurality of coded signals, and in response to different control signals, to provide different groups of said signals of said first plurality as output signals. In analog computer time-scale control, it is generally desirable that each group of output signals selected by the selection circuit represent adjacent time scales.

The exemplary selection circuit of FIG. 2 is shown as comprising twenty-one conventional NOR gates labelled GA–1 through GA–6 and G–0 through G–15. Gates GA–1 through GA–6 serve to decode the two-digit binary-coded input signal on lines 106 and 108 to energize a selected one of four lines in accordance with the selected one of the four time scales. If the X1 time scale is chosen, energizing line 201, gate G–1 connects the $\phi_2$ phase to gate G–14 and line 120, gate G–0 connects the $\phi_1$ phase to gate G–13 and line 124, and gate G–2 connects the $\phi_3$ phase to gate G–15 and line 122. If the X10 time scale is chosen, energizing line 202, gate G–4 connects the $\phi_3$ phase to gate G–14 and line 120, gate G–5 connects the $\phi_4$ phase to gate G–15 and line 122, and gate G–3 connects the $\phi_2$ phase to gate G–13 and line 124. If the X100 time scale is chosen, energizing line 203, gate G–7 connects the $\phi_4$ phase to gate G–14 and line 120, gate G–8 connects the $\phi_5$ phase to gate G–15 and line 122, and gate G–6 connects the $\phi_3$ phase to gate G–13 and line 124. Lastly, if the X1000 time scale is chosen, energizing line 204, gate G–10 connects the $\phi_5$ phase to gate G–14 and line 120, gate G–11 connects the $\phi_6$ phase to gate G–15 and line 122, and gate G–9 connects the $\phi_4$ phase to gate G–13 and line 124. Thus it will be seen that selection of a given time scale (out of four choices) routes a given one of four phases ($\phi_2$, $\phi_3$, $\phi_4$, or $\phi_5$) to gate G–14 and line 120, from where it goes to all integrators not specially patched to provide a special time scale, and simltaneously routes the adjacent higher phase and adjacent lower phase to gates G–15 and G–13, respectively, from where they are routed via lines 122 and 124, respectively, to the $X10^0$ and $X10^2$ patch-holes, to allow patching as required at specially selected integrators to provide selected time-scales for individual integrators which are greater by a factor of 10 or lesser by a factor of 10.

While the invention has been illustrated as used with an over-ride switching input circuit in an improved time-scale control system which allows the time-scale of the entire computer to be multiplied simply by mere pushbutton selection, the invention will also be seen to be useful in simple prior art systems where no over-ride switching is used and no time-scale multiplying is used, as use of the invention to control one of many capacitors by the signal on a single line will still be advantageous.

Figure 3:
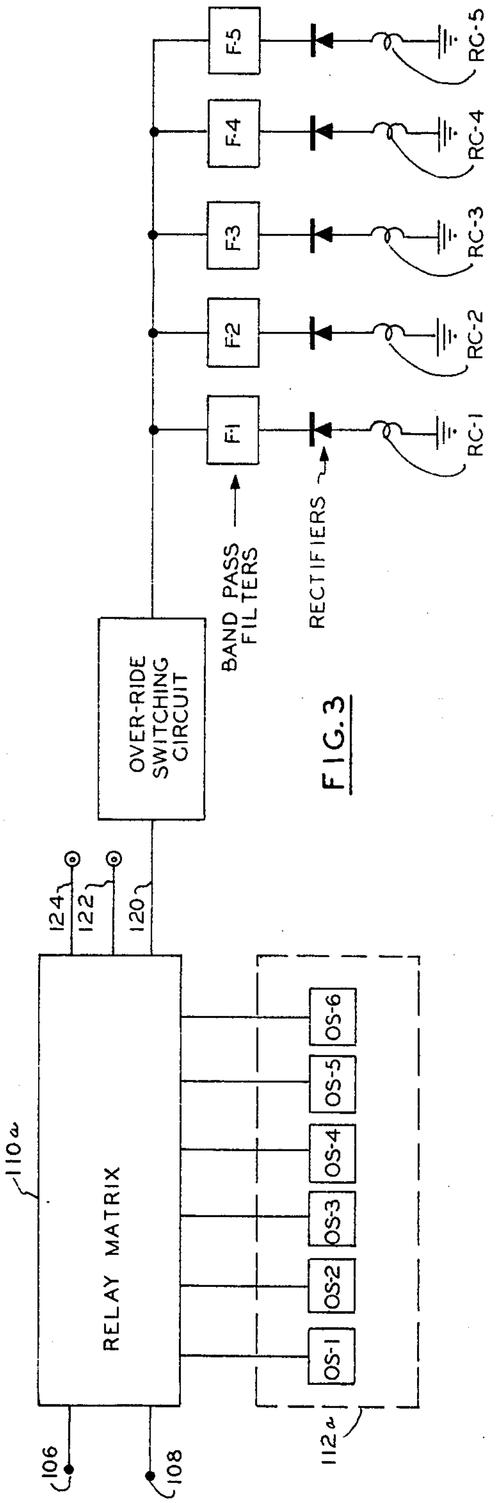
FIGS. 3 and 4 illustrate portions of alternative embodiments of the invention.

Rather than the specific pulse-phasing encoding scheme described above, pushbutton selection information may be routed to appropriate decoders in the form of selected frequencies, or in the form of selected voltage amplitudes. In FIG. 3, generator 112*a* comprises a plurality of oscillators OS–1 through OS–6 which apply six signals of six different frequencies to relay matrix 110*a*, and pushbutton selection routes a selected three of the frequencies to each integrator via busses 120, 122 and 124. The decoder circuitry in FIG. 3 is shown as comprising a plurality of frequency-selective band-pass filters F–1 through F–5, each of which is tuned to provide an output upon receiving an input corresponding to a respective one of five of the six signal frequencies, and the output of each filter is rectified and applied to energize a respective magnetic reed relay coil (of the group RC–1 through RC–5), to close a normally open contact (not shown) to connect a respective capacitor to the integrator summing junction terminal. The arrangement of FIG. 3 has the advantage over the previously-described encoding-decoding arrangement in that it is unnecessary to route the six signals from the generator to the decoder of each integrator, assuming, of course, that the oscillator frequencies and filter pass-bands are controlled with sufficient accuracy.

Figure 4:
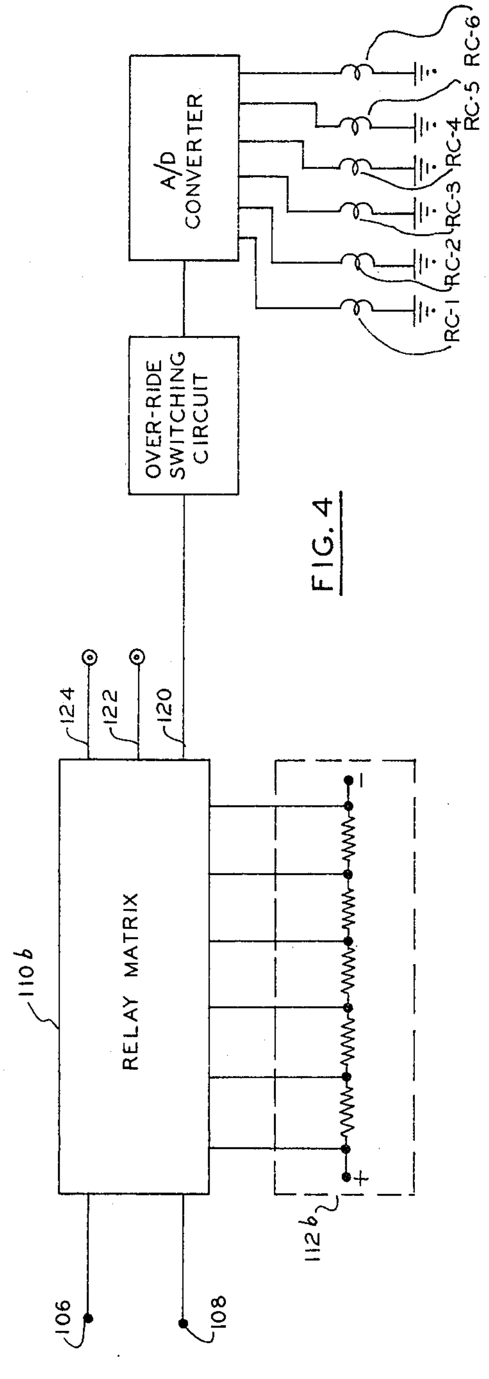

A further system illustrated in FIG. 4 utilizes a very simple encoder 112*b* comprising a simple voltage divider having six taps, which are selectively connected by relay matrix 110*b* to control busses 120, 122, 124 in accordance with pushbutton operation. The decoder 116*b* of the FIG. 4 system comprises a simple analog-digital converter operative to energize a selected one of the six reed relays shown in accordance with the magnitude of the signal on buss 120. In FIG. 4 it is also unnecessary to route the six signals from generator 112*b* to the decoder (A/D converter) associated with each integrator. The selection matrices 110*a* and 110*b* of FIGS. 3 and 4 both may comprise relay matrices connected in a manner apparent to those skilled in the art to provide the same logical outputs as the gate matrix of FIG. 2. The gate matrix of FIG. 2 itself may be used easily with the frequency coding system of FIG. 3. If gates are used with the amplitude coding system of FIG. 4, the particular gates used must be generally proportionally responsive, of course, to the different analog levels on the various voltage divider taps. A relay (electromagnetic switch) matrix may be used, of course, in any embodiment of the invention.

In addition to coding by pulse phasing, frequency or repetition rate, or magnitude, the invention may be readily implemented using pulse width coding, using known techniques, in a manner which will be obvious to those skilled in the art as a result of this disclosure. For example, multivibrator MV in FIG. 1 could be re-arranged to apply its output signal simultaneously to all five pulse generators in FIG. 1 and each of the five generators be arranged to provide a different width pulse, so that their trailing edges occurred successively, and each decoder arranged to operate its respective relay when two trailing edges were applied to it simultaneously.

The embodiments of the invention thus far described are shown as utilizing encoded signals having different characteristics for controlling integrator time scale. It is also within the scope of the present invention to encode integrator operating mode (i.e. switching between "Operate," "Hold" and "Initial Condition" configurations), so that a single signal on a single line will determine integrator operating mode. As in the case of integrator time-scale control, the encoding may be done in accordance with the phase of a waveform, the frequency of a waveform, or in accordance with a voltage amplitude or magnitude. However, because most integrators utilize only the three mentioned modes, and because as many as four such modes may be controlled simply, merely by signals on a pair of wires, a phase, frequency or magnitude coding of such mode control signals usually has little if any advantage. However, if control of integrators in five or more modes is desired, the system of the present invention may offer attractive advantages. As well as controlling the three or four switches usually used to switch an integrator between "Hold," "Operate" and "Reset" modes, the system of the present invention may be used to select one or more of a variety of input scaling resistances, or one of a variety of feedback resistances for an amplifier. As mentioned above, the invention is applicable as well to controlling switches which selectively connect computer circuits other than integrators. It will be apparent that switches for a digital-to-analog converter using a ladder network, for example, may be selectively closed to provide desired output voltages. In such arrangements, it ordinarily will be desirable that more than one switch be closed at a given time. It is within the scope of the invention to provide more complex coding to allow plural switch control over a single line, or to control a large number of switches with relatively few lines. For example, by straightforward alteration of selection matrix 110, it is possible for a given push-button selection to provide two or more of the pulse generator phases (or frequencies, or magnitudes, etc.) on line 120, so that two or more of relays RC–1 through RC–5 would close simultaneously, and the contacts of such relays may be connected to close switches of a conventional digital-to-analog converter, for example.

It will thus be seen that the objects set forth above, among those made apparent from the preceding description, are efficiently attained, and since certain changes may be made in the above constructions without departing from the scope of the invention, it is intended that all matter contained in the above description or shown in the accompanying drawing shall be interpreted as illustrative and not in a limiting sense.

The embodiments of the invention in which an exclusive property or privilege is claimed are defined as follows:

1. Analog computer appartus, comprising, in combination: a plurality of electronic analog computer circuits each including a plurality of components and each having a plurality of switches for selectively connecting their respective components into a multiplicity of different operating conditions and each having a decoder means operative in response to coded signals to selectively operate said switches; a first control buss; circuit means for connecting each of said decoder means to said first control buss; means for providing a multiplicity of differently coded signals associated with a multiplicity of said different operating conditions; and selective switching means for connecting at least one of any of said multiplicity of differently coded signals to said first control buss.

2. Apparatus according to claim 1 having a second control buss and in which each of said circuit means for connecting a decoder means to said first control buss comprises an overriding switching means for connecting its respective decoder means selectively to said first control buss or said second control buss, each of said overriding switching means having an overriding control terminal and being operative to automatically connect the decoder means of its respective computer circuit to receive signals from said first control buss in the absence of a connection being made to its respective overriding control terminal and to receive signals from said second control buss when said overriding control terminal has been connected to said second control buss, said selective switching means being operative to connect at least one of said differently coded signals to said second control buss.

3. Apparatus according to claim 1 in which said means for providing a multiplicity of coded signals comprises means for providing a multiplicity of recurrent signals of different phase and in which each of said decoder means comprises a multiplicity of phase detector means each connected to be responsive to one of said recurrent signals.

4. Apparatus according to claim 1 in which said means for providing a multiplicity of coded signals comprises means for providing a multiplicity of signals of different frequencies and in which each of said decoder means comprises a multiplicity of filters.

5. Apparatus according to claim 1 in which said coded signals comprise a multiplicity of signals of different magnitudes and in which each of said decoder means includes analog-to-digital converter means to selectively operate different ones of said switches, as coded signals of different magnitudes are provided.

6. Apparatus according to claim 1 in which said means for providing a multiplicity of coded signals comprises means for providing a multiplicity of pulses having different time durations.

7. Apparatus according to claim 1 having a second control buss, a patch-hole associated with each of said computer circuits and connected to said second control buss, and selective connection means associated with each of said computer circuits for individually connecting the decoder means of selected ones of said computer circuits to be responsive to signals on said second control buss instead of signals on said first control buss.

8. Apparatus according to claim 1 in which each of said circuit means for connecting a decoder means to said first control buss comprises an overriding switching means having an overriding control terminal, said overriding switching means being operative to automatically connect its associated decoder means to receive signals from said first control buss in the absence of a connection being made to its respective overriding control terminal and to receive signals instead from said overriding control terminal when signals have been connected to said overriding control terminal, said apparatus including a patchbay and the overriding control terminals of each of said overriding switching means and the each of said differently coded signals being routed to said patchbay, whereby any of said different coded signals may be selectively patched to any of said overriding control terminals and a single selected connection to an overriding control terminal allows control of its associated analog computer circuit in any one of said multiplicity of different operating conditions.

9. Apparatus according to claim 2 in which said overriding control terminal comprises a patchboard terminal adapted to be connected by a patchcord to said second control buss.

10. Apparatus according to claim 2 in which said selective switching means comprises a multiplicity of gate circuits connected to said plurality of coded signals and operative in response to an input signal representing a desired operating condition for said computer elements for selectively connecting a pair of said coded signals to said first and second control busses.

11. Apparatus according to claim 2 having a third control buss and in which each of said overriding switching means includes a second overriding control terminal and is operative to connect the decoder means of its respective computer elements to receive signals from said third control buss when said second overriding terminal has been connected to said third control buss, and in which said selective switching means is operative to connect a third of said coded signals to said third control buss.

12. Apparatus according to claim 2 in which said multiplicity of operating conditions are characterized by an ordered sequence of values of an operating condition, and in which said selective switching means is operative in response to different input signals to simultaneously connect different pairs of said differently coded signals to said first and second control busses, respectively, with each pair of said differently coded signals representing an adjacent pair of said values of said operating condition, and in which said apparatus includes means for applying said different input signals to said selective switching means.

13. Apparatus according to claim 3 in which each of said phase detector means is connected to a respective one of said coded signals and to the signal from said overriding switching means.

14. Apparatus according to claim 10 having manually-operated switching means for providing said input signal representing said desired operating condition.

15. Apparatus according to claim 10 having digital register means adapted to store a signal from a digital computer to provide said input signal representing said desired operating condition.

16. Analog computer apparatus, comprising, in combination: a plurality of electronic integrator circuits each having a plurality of switches for connecting selected capacitors to determine the operating time scales of said integrator circuits and a decoder means operative in response to coded signals to selectively control said switches; first and second control busses; an overriding switching means associated with each of said integrator circuits for connecting its respective decoder means selectively to said first control buss and to said second control buss, each of said overriding switching means having an overriding control terminal and being operative to automatically connect the decoder means of its respective integrator circuit to receive signals from said first control buss in the absence of a connection being made to its respective overriding terminal and to receive signals from said second control buss when said overriding terminal has been connected to said second control buss; means for providing a plurality of coded signals representing a plurality of integrator time scales; and selective switching means for simultaneously connecting a pair of said coded signals representing two different time scales to said first and second control busses, respectively.

References Cited

UNITED STATES PATENTS

| | | | |
|---|---|---|---|
| 3,153,202 | 10/1964 | Woolam | 330—9 |
| 3,341,696 | 9/1967 | Thaulow | 235—183 |
| 3,374,362 | 3/1968 | Miller | 235—183 |

OTHER REFERENCES

Korn, G. A., Performance of Operational Amplifiers With Electronic Mode Switching, IEEE Transact. EC–12, June 1963, pp. 310–312.

Eckes, H. R., A. Fast Mode-Control Switch for Iterative Differential Analyzers, IEEE Transactions EC–14, December 1965, pp. 946–950.

MALCOLM A. MORRISON, Primary Examiner

F. D. GRUBER, Assistant Examiner

U.S. Cl. X.R.

235—150.5, 150.51, 184; 328—127; 340—166, 171